US012405576B1

(12) United States Patent
Blonder

(10) Patent No.: US 12,405,576 B1
(45) Date of Patent: Sep. 2, 2025

(54) HIGH-FIDELITY LUNAR PHASE MECHANISM FOR CLOCKS AND WATCHES

(71) Applicant: Genuine Ideas, LLC, Brookline, MA (US)

(72) Inventor: Greg Blonder, Brookline, MA (US)

(73) Assignee: Genuine Ideas, LLC, Brookline, MA (US)

( * ) Notice: Subject to any disclaimer, the term of this patent is extended or adjusted under 35 U.S.C. 154(b) by 0 days.

(21) Appl. No.: 19/173,491

(22) Filed: Apr. 8, 2025

Related U.S. Application Data

(60) Provisional application No. 63/631,851, filed on Apr. 9, 2024.

(51) Int. Cl.
G04B 19/26 (2006.01)
G02B 6/08 (2006.01)

(52) U.S. Cl.
CPC ............. *G04B 19/268* (2013.01); *G02B 6/08* (2013.01)

(58) Field of Classification Search
CPC ............................... G04B 19/26; G04B 19/268
See application file for complete search history.

(56) References Cited

U.S. PATENT DOCUMENTS 4,274,154 A * 6/1981 Dostoomian ........ G02B 6/0008 368/239
5,200,024 A 4/1993 Blonder et al.
8,498,179 B2 7/2013 Montet et al.
8,995,233 B2 * 3/2015 Goeller ................ G04B 19/262 368/18
9,665,070 B2 * 5/2017 Dordor ............... G04C 17/0091
11,036,185 B2 * 6/2021 Zaugg .................. G04B 19/268
2006/0039244 A1 * 2/2006 Gyger ...................... G04G 9/00 368/296
2006/0250897 A1 11/2006 Brewer
(Continued)

FOREIGN PATENT DOCUMENTS

CN 1734375 A 2/2006

OTHER PUBLICATIONS

Arnold & Son, "Astronomy Luna Magna" Retrieved from the Internet under https://www.arnoldandson.com/collections/luna-magna/ on Apr. 7, 2025, 17 pages.
(Continued)

*Primary Examiner* — Edwin A. Leon
*Assistant Examiner* — Jason M Collins
(74) *Attorney, Agent, or Firm* — Nutter McClennen & Fish LLP

(57) ABSTRACT

A display device produces a view-independent virtual image of a three-dimensional object includes a three-dimensional model comprising at least two visually distinct regions. The device also includes a fused imaging fiber optic plate (FIFOP) formed from a bundle of optically aligned fibers. The FIFOP has a (i) a viewing surface formed by the polished output ends of the fibers; and (ii) a shaped cavity formed on the opposite side of the FIFOP. The cavity is defined by the input ends of the fibers and is dimensioned to receive the three-dimensional model in close proximity. The FIFOP is configured to transmit a virtual image of the three-dimensional model to the viewing surface such that the image appears substantially fixed and angle-independent to an observer.

20 Claims, 11 Drawing Sheets

(56) References Cited

U.S. PATENT DOCUMENTS

2006/0251365 A1 11/2006 Brewer
2021/0141342 A1* 5/2021 Amano .................. G04B 19/10

OTHER PUBLICATIONS

Banerji, S., et al., "Imaging with flat optics: metalenses or diffractive lenses?," Optica vol. 6, Issue 6, pp. 805-810 (2019).

Blonder, G., "Lunase moon phase watch mechanism," Modified Nov. 17, 2024. Retrieved from the Internet under https://genuineideas.com/ArticlesIndex/phase.html on Apr. 7, 2025, 14 pages.

Blonder, G., "Conic Lunase," Modified Feb. 4, 2025. Retrieved from the Internet under https://genuineideas.com/ArticlesIndex/conic.html on Apr. 7, 2025, 13 pages.

Doulton, R., "Introducing The Sarpaneva Lunations Black Ruthenium A dark Moon rising . . . ," dated May 29, 2023, Retrieved from the Internet under https://monochrome-watches.com/introducing-sarpaneva-lunations-black-ruthenium-specs-price/ on Apr. 7, 2025, 8 pages.

Duggan, D., "A Guide to the Moonphase Complication," Retrieved from the Internet under https://www.davidduggganwatches.co.uk/one-to-watch/2019/a-guide-to-the-moonphase-complication/ on Apr. 7, 2025, 6 pages.

Fong, C., "Analytical Methods for Squaring the Disc" Seoul ICM 2014, Retrieved from the Internet under https://arxiv.org/ftp/arxiv/papers/1509/1509.06344.pdf on Apr. 7, 2025, 36 pages.

Freeth, T., "An Ancient Greek Astronomical Calculation Machine Reveals New Secrets," dated Jan. 1, 2022, Retrieved from the Internet under https://www.scientificamerican.com/article/an-ancient-greek-astronomical-calculation-machine-reveals-new-secrets/ on Apr. 7, 2025, 26 pages.

Goulard, B., "Hands-on-Andreas Strehler Papillon Sauterelle à Lune Exacte—The Most Precise MoonPhase Wristwatch Ever," dated Aug. 25, 2016, Retrieved from the Internet under https://monochrome-watches.com/andreas-strehler-papillon-sauterelle-lune-exacte-most-precise-moonphase-wristwatch-ever-review-price/ on Apr. 7, 2025, 12 pages.

Hodinkee, "Moon Phase" Retrieved from the Internet under https://www.hodinkee.com/watch101/moon-phase on Apr. 7, 2025, 8 pages.

Munchow, J., "The 10 Most Accurate Moon Phase Wristwatches Today (Plus Honorable Mention)," Retrieved from the Internet under https://quillandpad.com/2019/05/05/the-10-most-accurate-moon-phase-wristwatches-today-plus-honorable-mention/ on Apr. 7, 2025, 39 pages.

Nasa Science, "What Are the Moon's Phases?" Retrieved from the Internet under https://spaceplace.nasa.gov/moon-phases/en/ on Apr. 7, 2025, 5 pages.

Popkonstantinović, B., et al., "Synthesis, Solid Modeling and Working Simulation of Moon Phase Clock Mechanism," 4th International Scientific Conference on Geometry and Graphics moNGeometrija 2014 At: Serbia, Vlasina, vol. 1, 17 pages.

Schott, "Fused Imaging Fiber Optics," Retrieved from the Internet under https://www.schott.com/en-ae/products/fused-imaging-fiber-optics-p1000346 on Apr. 7, 2025, 8 pages.

Wikipedia, "Stereographic projection" Last edited Jan. 6, 2025. Retrieved from the Internet under https://en.wikipedia.org/wiki/Stereographic_projection on Apr. 7, 2025, 18 pages.

Wikipedia, "Optical comparator." Last edited Sep. 3, 2023. Retrieved from the Internet under https://en.wikipedia.org/wiki/Optical_comparator on Apr. 7, 2025, 4 pages.

* cited by examiner

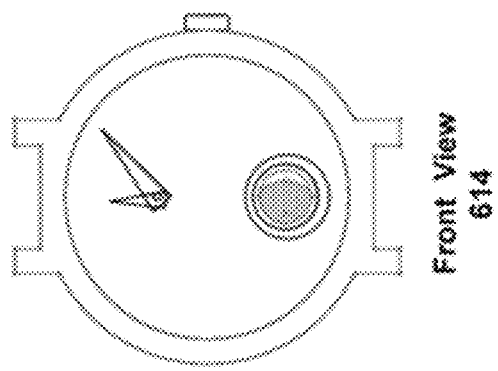
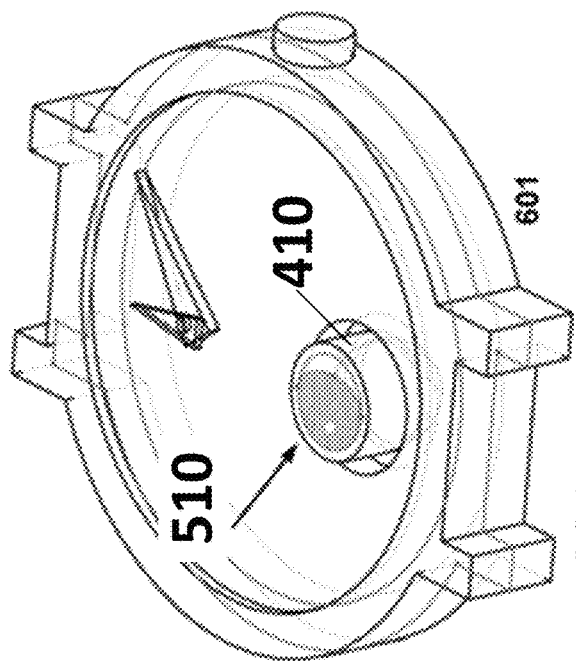
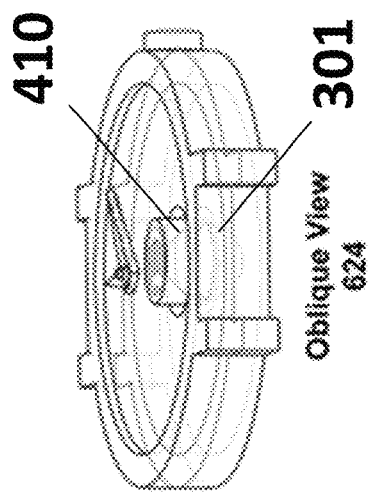
FIG. 8

HIGH-FIDELITY LUNAR PHASE MECHANISM FOR CLOCKS AND WATCHES

PRIORITY

This patent application claims priority from provisional U.S. patent application No. 63/631,851, filed Apr. 9, 2024, entitled, "High-Fidelity Lunar Phase Mechanism for Clocks and Watches," and naming Greg Blonder as inventor, the disclosure of which is incorporated herein, in its entirety, by reference.

FIELD OF THE INVENTION

Illustrative embodiments of the invention generally relate to a device for the continuous display of lunar phases and, more particularly, illustrative embodiments relate to mechanical watches or clocks comprising a moon sphere divided into light and dark sections.

BACKGROUND OF THE INVENTION

For thousands of years, the moon and its phases have played an important role in human history—from determining the tides, to lighting the night for travel, to acting as a universal calendar and timekeeper. After mechanical clocks were invented, lunar indicators were soon added to the clock dial or display, most typically by a rotating a flat moon dial that was closely synced to the lunar synodic month (the time between new moons as viewed from the earth's surface). Alternatively, an orrery-style display was occasionally employed. Here, a three-dimensional replica of the moon, in the form of a sphere bisected into dark and light hemispheres, rotated in sync with the actual moon. Such a bisected sphere can be found in the 100 BCE Antikythera mechanism.

However, while the period of the lunar month is easily mimicked with a carefully selected gear train, replicating the shape of the lunar terminator (the fuzzy line between the illuminated and dark surface of the moon as viewed from the earth) has challenged inventors. The moon, due to tidal locking, presents the same face to the earth throughout the month. It is illuminated by the sun, forming a bisected sphere of dark and light hemispheres running as a geodesic from its (approx.) north to south lunar poles. As the moon rotates around the earth, the position of the terminator between dark and light sweeps across the surface. It has been known since the ancient Greeks that a geodesic line takes the shape of a half-ellipse when viewed from the side.

SUMMARY OF VARIOUS EMBODIMENTS

Illustrative embodiments provide a high-fidelity, angle-independent lunar phase display that overcomes the significant limitations of prior-art methods used in mechanical watches and clocks. Traditional displays-whether based on rotating moon discs or bisected lunar spheres-suffer from inaccuracies in depicting the true shape and progression of the lunar terminator. In particular, such displays are often dependent on the viewer's angle, resulting in distorted or misleading representations of the current moon phase. By contrast, illustrative embodiments utilize a fused imaging fiber optic plate (FIFOP) in conjunction with a rotating lunar model to generate a virtual two-dimensional image of the moon's illuminated and darkened regions. This image appears stable and correct from a wide-range of viewing angles, closely matching the actual astronomical appearance of the moon as seen from Earth.

Additionally, various embodiments offer optical and mechanical design flexibility while maintaining high image fidelity. The use of a fiber-formed cavity-rather than a conventional lens-based optical system-enables a thinner display structure, suitable for compact form factors like wristwatches. The ability to incorporate index-matching fluid or stepped terraces within the FIFOP cavity further reduces optical distortion caused by internal reflections, allowing for sharper image presentation. Optional visual enhancements, such as anti-reflection coatings or decorative backgrounds, further elevate the aesthetic quality of the display. Overall, various embodiments provide a robust, manufacturable, and visually accurate lunar phase indicator that delivers both scientific realism and artistic elegance in timekeeping applications.

From a manufacturing and product design perspective, illustrative embodiments provide several practical advantages. The use of passive optical components-namely the FIFOP and a mechanically driven lunar model-eliminates the need for electronic displays, reducing power consumption, complexity, and potential points of failure. The optical flattening effect of the FIFOP also allows the lunar sphere to be positioned deeper within the case, enabling a thinner overall profile ideal for wristwatches and elegant timepieces. Unlike complex prior-art solutions that rely on layered disks, multiple gear trains, or aperture masks, illustrative embodiments achieve a more accurate and visually appealing result with fewer moving parts and simpler assembly.

In accordance with an embodiment, a display device produces a view-independent virtual image of a three-dimensional object includes a three-dimensional model comprising at least two visually distinct regions. The device also includes a fused imaging fiber optic plate (FIFOP) formed from a bundle of optically aligned fibers. The FIFOP has a (i) a viewing surface formed by the polished output ends of the fibers; and (ii) a shaped cavity formed on the opposite side of the FIFOP. The cavity is defined by the input ends of the fibers and is dimensioned to receive the three-dimensional model in close proximity. The FIFOP is configured to project a virtual image of the three-dimensional model to the viewing surface such that the image appears substantially fixed and angle-independent to an observer.

In accordance with an embodiment, a device produces a view-independent representation of a three-dimensional object on a viewing surface (a "virtual image"). For purposes of this disclosure, the term "virtual image" refers to the optical effect created at the output surface of the device, where the transmitted light from the object forms a two-dimensional image that appears fixed and angle-independent to a human observer. This image may resemble a photograph or printed rendering of the object and does not convey depth cues of the three-dimensional form. The term is not intended to refer to a virtual image in the strict optical sense (i.e., where light rays appear to diverge from a point), but rather describes the flattened visual output as perceived through the fiber-optic or lens-based system. In various embodiments, the end effect is that the optical device projects a 2D representation of the 3D object to the display surface, e.g., as if the image were printed on a sheet of paper.

The device includes a three-dimensional model having at least two visually distinct regions. A fused imaging fiber optic plate (FIFOP) comprises a bundle of optically aligned fibers. The FIFOP has a projection viewing surface formed by the polished output ends of the fibers. Also, the FIFOP has a shaped cavity formed on the opposite side of the FIFOP. The cavity is defined by input ends of the fibers and configured to receive the three-dimensional model in close proximity. The FIFOP is configured to transmit a virtual image of the three-dimensional model to the viewing surface such that the image appears angle-independent to an observer.

The three-dimensional model may be rotatable within the cavity. The visually distinct regions may represent the illuminated and shadowed portions of a lunar phase. The three-dimensional model may be mounted on an axle and mechanically synchronized to a time-based cycle.

The shaped cavity may have a series of stepped flat terraces configured to minimize optical distortion caused by light rays refracting at the cavity surface. The space between the model and the FIFOP may be filled with an index-matching fluid or gel to reduce internal reflection and suppress refraction. Particularly when the shaped cavity has a curved smooth surface. The cavity and the model may have matching or counterpart shapes. For example, the cavity may be substantially hemi-spherical and the model may be substantially spherical.

Thus, the cavity may conform to the geometry of the model to maintain optical proximity. In various embodiments, the surface of the three-dimensional model may be positioned within approximately 10% of a diameter of the model from the fiber input ends of the FIFOP. Additionally, or alternatively, the surface of the three-dimensional model may be positioned within 1 millimeter of the fiber input ends of the FIFOP to preserve high virtual image fidelity.

In accordance with another embodiment, a method displays a high-fidelity lunar phase in a timekeeping device. A three-dimensional moon model is provided. The model includes visually contrasting regions configured to represent the illuminated and darkened portions of the moon. An optical relay component that converts a 3D image into a 2D virtual image is positioned adjacent at least a portion of the moon model. The optical relay component has a viewing surface and a cavity. The three-dimensional model is disposed within or proximate to the cavity. The orientation of the three-dimensional moon model is altered to simulate the progression of lunar phases over time. A virtual image of the moon model is provided on the viewing surface of the optical relay component. The virtual image surface of the optical relay component is integrated into a visible portion of a watch or clock housing.

In various embodiments, integrating the virtual image surface enables a user to observe an accurate, angle-independent representation of the moon's phase. To that end, the proximity between the surface of the moon model and the cavity wall may be maintained within approximately 10% of the diameter of the model. Vignetting caused by total internal reflection may be mitigated by (i) filling the space between the moon model and the optical relay component with an index-matching fluid and sealing the cavity using a leak-resistant mechanism, and/or (ii) forming a plurality of stepped, flat terraces in the cavity surface to eliminate shallow-angle optical paths. The cavity may be dimensioned to maintain the surface of the moon model within a defined proximity of the cavity inner surface.

Among other things, the three-dimensional model may be a spherical model. The light portion and the dark portion may be two hemispheres of a bisected spherical model. Altering the orientation of the three-dimensional moon model may include rotating the spherical model about its axis. Rotating the spherical model about its axis may be performed in synchrony with the lunar synodic period. Such that the bisected hemispheres as produced in the virtual image may simulate the changing illumination of the moon as seen from Earth.

The spherical model may include a photorealistic texture of the lunar surface applied to at least the illuminated hemisphere to enhance visual realism. The optical relay component may be a FIFOP comprising optical fibers with a numerical aperture (NA) greater than 0.6. In various embodiments, this advantageously assists with maintaining image fidelity over a wide range of viewing angles.

The hemispherical cavity of the FIFOP may have a radius within 10% of the diameter of the lunar sphere, thereby preserving proximity for high-fidelity virtual imaging. An index-matching fluid may be positioned between the lunar sphere and the FIFOP to reduce internal reflections and enhance optical clarity. The FIFOP may include a tapered fiber bundle. The virtual image may appear magnified relative to the actual diameter of the lunar sphere.

The spherical model may be rotated by a gear train synchronized to the lunar synodic month, comprising a 59-tooth gear or equivalent mechanism. The FIFOP and lunar sphere assembly may be mounted within a timekeeping device selected from a wristwatch or a clock. The opposite surface of the FIFOP may present the virtual image on a flat display window of the timekeeping device, such that the user perceives a consistent lunar phase image from any angle. A second viewing surface comprising glass or a second FIFOP may be placed on the opposite side of the lunar sphere. In various embodiments, this enables comparative viewing of both three-dimensional and virtual two-dimensional moon phase representations.

In accordance with another embodiment, a high-fidelity lunar phase display device includes one surface of a FIFOP placed atop a rotating lunar sphere. The lunar phase may be viewed on the opposing surface of the FIFOP. The FIFOP may include a cavity larger than the rotating lunar sphere. The sphere may rotate within the cavity.

The rotating lunar sphere may include two contrasting hemispheres to indicate the illuminated and dark surface of the moon. The cavity may be substantially hemispherical. The FIFOP may include a bundle of optical fibers fused or bonded together, then sliced into a plate with polished surfaces on both sides.

In accordance with another embodiment, a watch or clock includes any of the lunar phase display described above. A clockwork mechanism may drive a shaft to rotate the lunar sphere. In various embodiments, the display of the virtual image may be passive.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 8 schematically shows a watch having the FIFOP 410 mounted over a bisected lunar sphere in accordance with illustrative embodiments.

DESCRIPTION OF ILLUSTRATIVE EMBODIMENTS

In illustrative embodiments, a Fused Imaging Fiber Optic Plate (FIFOP) is provided over a rotating bisected lunar sphere. The FIFOP captures the image of the 3D sphere and projects it as a two-dimensional virtual image on the surface of the plate. This eliminates angular distortion and depth-related visual inconsistencies, creating a high-fidelity, realistic representation of the lunar phase that remains accurate regardless of the viewer's angle. This advantageously provides more visually accurate, and technically elegant moon phase display. Details of illustrative embodiments are discussed below.

Clockmakers have devised increasingly complex and accurate mechanisms to display the current lunar phase. Today, by leveraging advances in gearing design, these mechanisms can track the average lunar "synodic" month of 29.530588 mean solar days to an accuracy of greater than one day in two million years. However, the visual display of the lunar phase (full moon, quarter moon, crescent, etc.) has lagged in fidelity—those representations are notional at best, and misleading at worse. Thus, various embodiments advantageously present the lunar phase in a high-fidelity manner, and with a particularly simple, reliable, and low complexity mechanism.

While the period of the lunar month is easily mimicked with a carefully selected gear train, replicating the shape of the lunar terminator (the line between the illuminated and dark surface of the moon as viewed from the earth) has challenged inventors. The moon, due to tidal locking, presents the same face to the earth throughout the month. It is illuminated by the sun, forming a bisected sphere of dark and light hemispheres running as a geodesic from its (approx.) north to south lunar poles. As the moon rotates around the earth, the position of the terminator between dark and light sweeps across the surface. A geodesic line takes the shape of a half-ellipse when viewed from the side.

Figure 1:
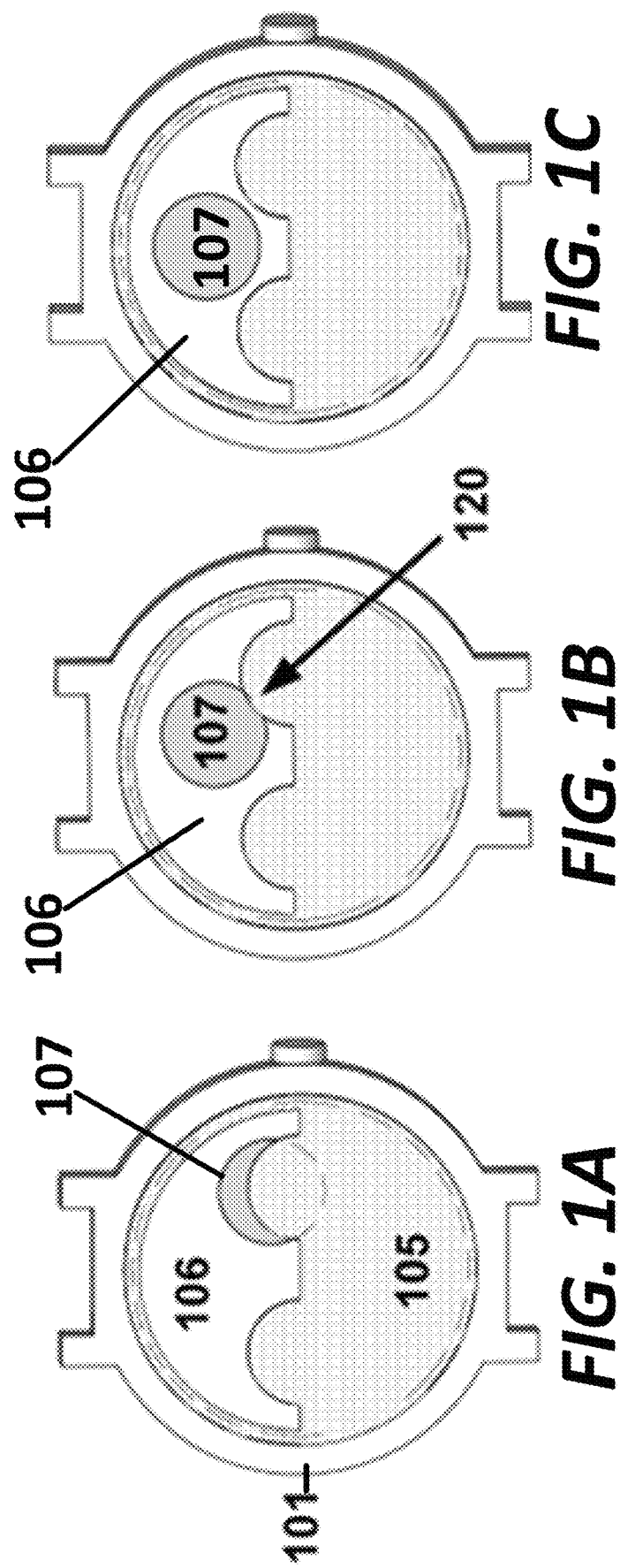
FIGS. 1A-1C schematically show a moon disk and aperture plate in accordance with illustrative embodiments.

FIGS. 1A-1C schematically show a moon disk 106 and aperture plate 105, illustrating the low fidelity lunar phase display typically seen clocks and watches. In various embodiments, the moon disk 106 is a flat, circular component that has two images of the moon (often stylized or photorealistic) (e.g., printed on it, spaced 180° apart). The disk 106 rotates slowly behind an aperture (a small cut-out window) of the aperture plate 105, revealing different portions of the moon image to simulate the lunar cycle. The aperture plate 105 is part of the watch face spanning watch body 101.

As the disk 106 turns over the course of approximately 29.5 days (the length of a synodic lunar month), the visible portion of the moon changes—from new moon to full moon and back—mimicking the moon's phases. However, this simulation is not very accurate, especially in how it represents the shape of the terminator (the line between the lit and dark sides of the moon), which often appears as a simple circular arc rather than the more realistic elliptical curve seen from Earth.

The aperture plate 105 in FIG. 1A obscures part of the moon image 107 printed on disc 106, creating the appearance of a crescent. As the moon 107 rotates further during the month, it rises above the aperture and is occluded by a tiny circular "nibble" 120 in FIG. 1B. Finally, the moon in FIG. 1C is free of the aperture plate and becomes a full (or new) moon, depending on the relative disc 106 color.

The aperture method is visually attractive, thin, easy to manufacture and is, by far, the industry standard. However, the aperture method undesirably does not track the appearance of the actual physical moon.

Figure 2:
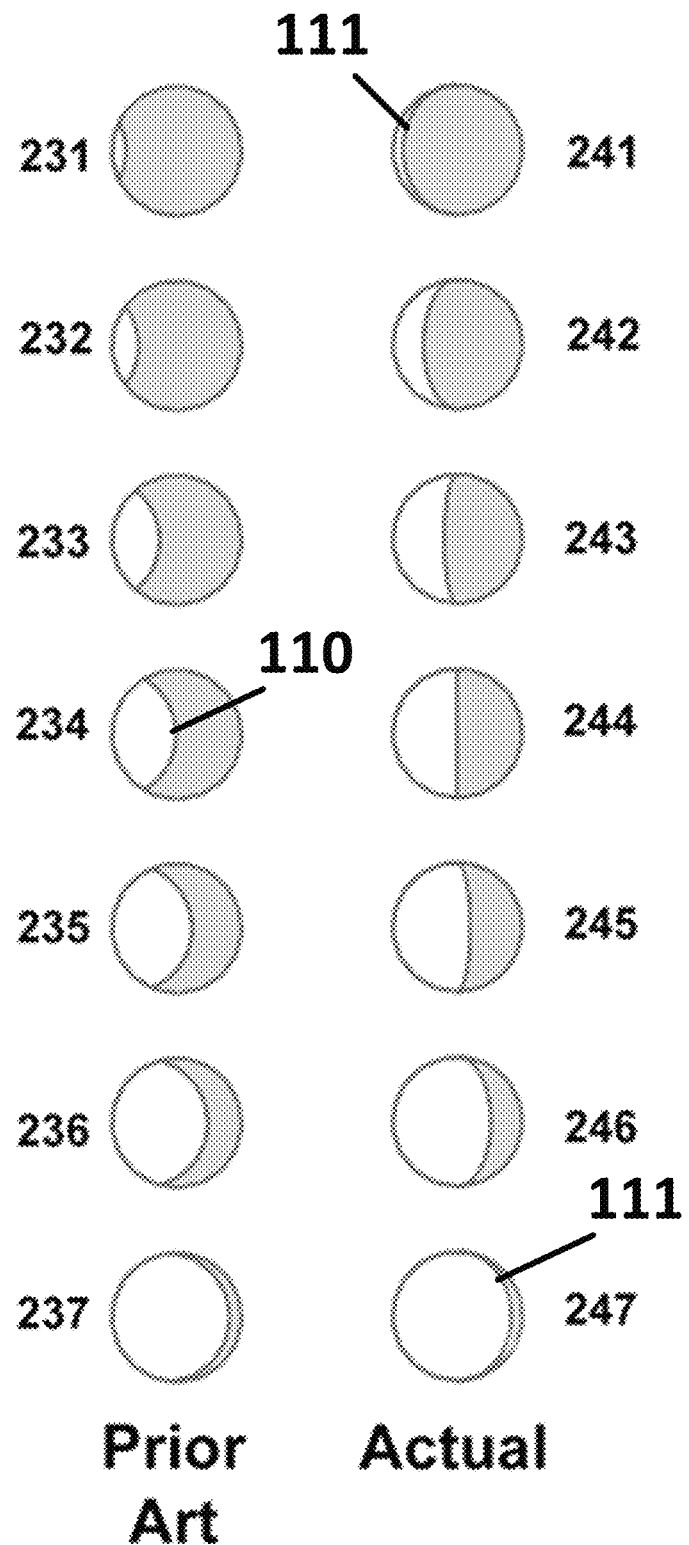
FIG. 2 schematically shows a comparison of the lunar phase display in aperture watches to the actual lunar phase.

FIG. 2 is a side-by side comparison during one lunar cycle of the moon in a prior-art aperture watch versus the actual moon phases as seen from Earth. The line running from pole-to-pole is the "terminator" separating the illuminated from the dark (unilluminated) surface of the moon. Undesirably, there are substantial discrepancies. For example, a half-moon phase 244 should be represented by a straight-line terminator 110. However, in the watch 101, the terminator 234 is a semi-circular arc. In the real moon as seen from Earth, the actual crescent 111 changes curvature from left (moon phase 247) to right (moon phase 241). In the aperture watch prior art, curvature is undesirably constant and facing left.

To remedy these defects, some embodiments replace the fixed aperture plate 105 with a set of rotating lobed vanes, each chosen to obscure the moon disc with a more realistic terminator in a piece-wise manner throughout the month. Undesirably, the effect is both imperfect and, during part of the cycle when the vanes are shifting position, in an ambiguous state.

Some other embodiments rely on a meshed series of segmented rotating colored discs whose edges together approximate the actual shape of the terminator. While feasible, this undesirably adds layers of complexity and thickness to the mechanism, which results in added expense.

FIGS. 3A-3C schematically show a lunar sphere 301 display viewed at three angles to the watch face in accordance with illustrative embodiments. The method used to produce this effect is relatively low-complexity and the outcome is visually attractive. A small lunar sphere 301, bisected into a dark hemisphere 302 and light hemisphere 304, simply rotates around its own axis (in this example, an axis running from the watch's 12 to 6 o'clock positions). A bisecting line 303 (also referred to as a crescent line 303) is formed between the two hemispheres 302 and 304.

It should be noted that references to a "sphere" or "hemispheres" are made for convenience in describing the model of the moon and should not be construed as limiting the shape of the model or the number of visually distinct regions. The model need not be a perfect sphere; it may include ellipsoids, flattened globes, or other three-dimensional or pseudo-three-dimensional forms suitable (e.g., for simulating the lunar surface). Similarly, "hemispheres" may refer generally to differentiated regions of the model representing illuminated and darkened portions, and such regions may comprise two or more segments, gradients, textured zones, or blended transitions rather than strict binary divisions. Thus, discussion of "sphere" or "hemisphere" is for ease of discussion, and should be understood as disclosing reference any of the above-described shapes or configurations.

Furthermore, the term "rotation" includes both continuous and discrete (non-continuous or step-wise) motion, and encompasses mechanical, electromechanical, or electronically simulated alterations in the orientation or visibility of the model to simulate lunar phase progression. These terms are intended to capture a range of functional equivalents and prevent unnecessary limitations on the scope of various embodiments.

When viewed head-on in FIG. 3B (that is, perpendicularly to the watch face) an accurate image of a half-moon is perceived. In some embodiments, the lunar sphere may be textured with a photorealistic image of the actual moon for greater realism.

However, a watch (unlike the moon, which is tidal-locked and always faces the earth in the same direction) may often be viewed off-angle. When seen from the left side as in FIG. 3A, the apparent lunar phase shifts from "gibbous" (nearly fully illuminated FIG. 3A) to "crescent" (nearly fully dark FIG. 3C) moon when seen from the right side. The lunar sphere 301 also adds significantly to the thickness of the watch case, as it rises above the face for visibility.

Illustrative embodiments advantageously use a Fused Imaging Fiber Optic Plate (FIFOP, shown schematically as 410) to produce a high-fidelity lunar phase display. In the FIFOP 410, a bundle of optical fibers are fused or bonded together, then sliced into a plate 410 with polished surfaces on both sides. The FIFOP 410 may be composed of thousands to millions of precisely aligned tiny optical fibers that are fused together. As described further below, light entering one face of a fiber is transmitted to the opposite face, preserving the relative position, brightness, and color of each "pixel" of the object beneath. The result is a real-time, view-stable virtual image, which appears to lay flat on the surface. The FIFOP 410 is a passive, purely optical component. Advantageously, it does not require any electronics, software, sensors, or embedded logic to operate. Accordingly, illustrative embodiments enable a passive display device that requires no electronics or power source to generate the virtual image itself, although the timekeeping mechanism in a watch or clock may operate using a conventional battery or mechanical movement.

Light that enters one end of an optical fiber on one surface of the plate is relayed directly to the corresponding position on the opposite surface. When the fibers are uniformly aligned, this transmission produces a fiber-by-fiber (or pixel-by-pixel) replica of the real object, creating a high-fidelity virtual image on the viewing surface. Because the fiber bundle functions as a two-dimensional optical relay, it effectively suppresses depth perception, preventing the viewer from seeing through or around the object from off-angles (e.g., in direction 422). As a result, unlike a conventional three-dimensional object whose appearance varies with perspective, the virtual image appears fixed, regardless of the viewer's angle.

The numerical aperture (NA) of the optical fibers in the FIFOP 410 determines how much light each fiber can collect from different angles. A higher NA allows the virtual image to remain visible and accurate even when the viewer is looking from a steep angle relative to the watch face, which is particularly important for wristwatches and desk clocks that are frequently viewed off-axis (i.e., not directly from above). Therefore, a high NA is generally preferred to ensure the lunar phase display appears consistent regardless of the user's line of sight. Thus, the higher the fiber NA, the wider the viewing angle of the virtual image.

However, as the NA increases, each fiber begins to accept light from a wider cone, which can lead to blurring or distortion in the virtual image if the real object in this case, the lunar sphere model 301—is positioned too far from the fiber surface. To maintain a sharp and faithful image, illustrative embodiments position the lunar sphere model 301 in close proximity to the surface of the FIFOP 410, ideally within a shallow hemispherical recess 505 that hugs the sphere's 301 contour. This proximity ensures that each fiber 430 transmits light primarily from the adjacent, corresponding point on the sphere's 301 surface, preserving the crisp boundary between the illuminated and darkened regions and enhancing the fidelity of the displayed lunar phase.

Figure 4:
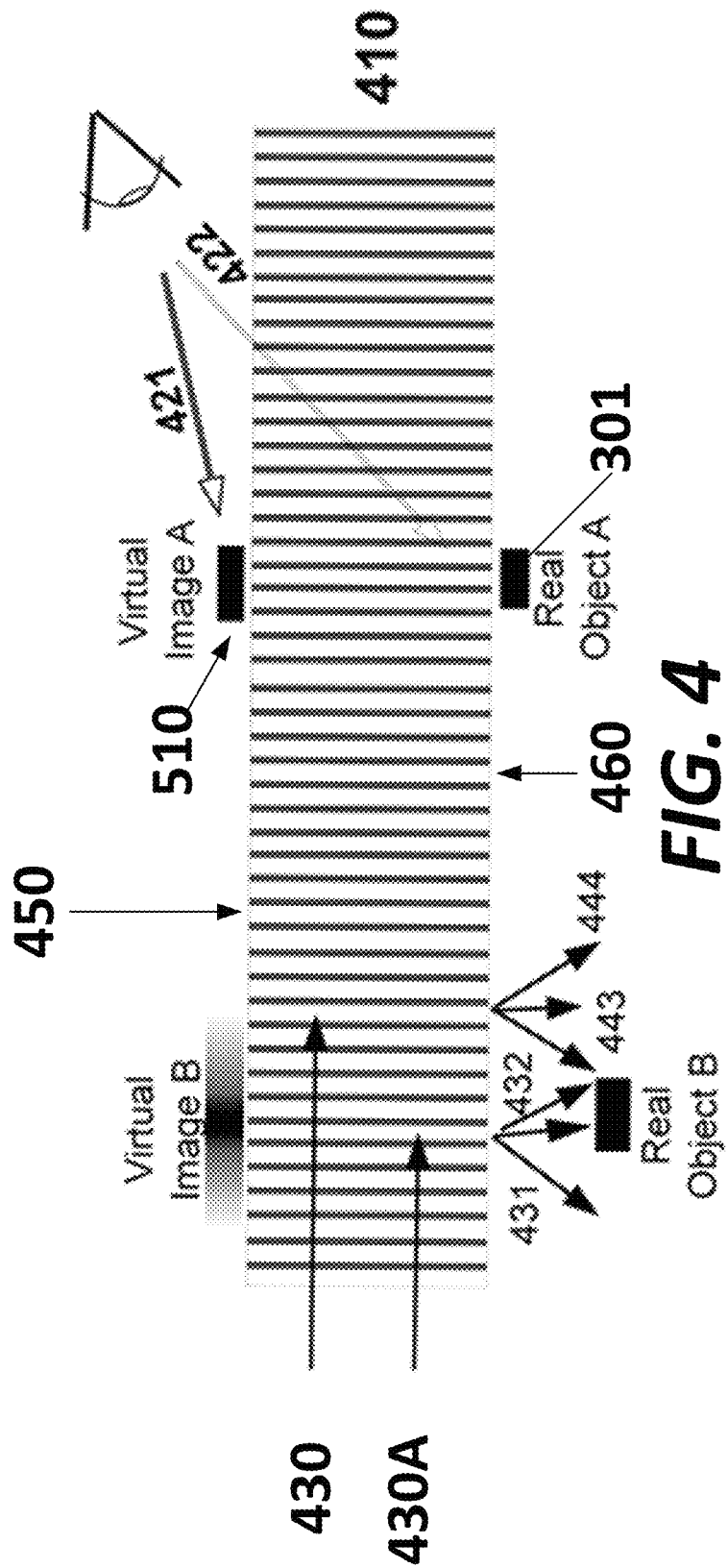
FIG. 4 schematically shows a Fused Imaging Fiber Optic Plate (FIFOP) in accordance with illustrative embodiments.

FIG. 4 schematically shows a Fused Imaging Fiber Optic Plate (FIFOP 410) 410 that transmits an image of an object such as "Real Object A" though a bundle of fiber optics (schematically indicated by the parallel vertical lines of plate 410) to the surface of the FIFOP 410 as a "virtual" image. Due to the two-dimensional index of refraction of a fiber bundle 430, the real object cannot be seen through the plate, as in ray 422.

When a Real Object A (e.g., a bisected lunar sphere) is pressed directly on one side of the plate, only fibers directly above the real object carry the image to the top virtual surface 450, creating a high-fidelity image. In this case "high-fidelity" means the color, dimensions and edges of the virtual image are substantially similar to the real object, as viewed perpendicularly to the plate. In other words, the virtual image preserves the recognizable features of the real object with sufficient fidelity such that the color distribution, geometric proportions, relative edge positions, and contrast are visually consistent with the appearance of the real object when viewed perpendicularly to the surface of the plate. Minor optical artifacts, blurring, or distortions that do not materially interfere with the accurate perception of the object's visual structure or function are considered to be within the scope of substantially similar.

As the real object is separated from the plate (e.g. Real Object B of FIG. 4 is separated from the bottom surface 460), multiple rays within the NA of the fiber gather light from different parts of the real object. For example, Fiber 430A and its rays 431, 432, etc. not only collect light from Real Object B (ray 432) but from open space next to Real Object B (ray 431), thus diluting the fidelity of the Virtual Image B, which will have a diffuse appearance as shown.

Due to the high numerical aperture (NA) of most FIFOPs, only close proximity to the plate ensures a real-object can be imaged to create a paper-like virtual image. Lower NA fibers diminish the need for proximity, but at the cost of a reduced viewing angle and blurring of the virtual image.

Although virtual image A and virtual image B are shown as above the surface of the FIFOP 410, it should be understood by those skilled in the art that the virtual image produced by the FIFOP 410 appears on the flat viewing surface, not projected above it. The image is perceived as a two-dimensional representation of the underlying three-dimensional model, almost as if printed on the surface, and is not projected above or beyond the surface. Due to the coherent alignment of the fibers, the virtual image maintains visual fidelity and spatial accuracy, while removing depth cues and angular variation associated with direct viewing of a 3D object.

Figure 5:
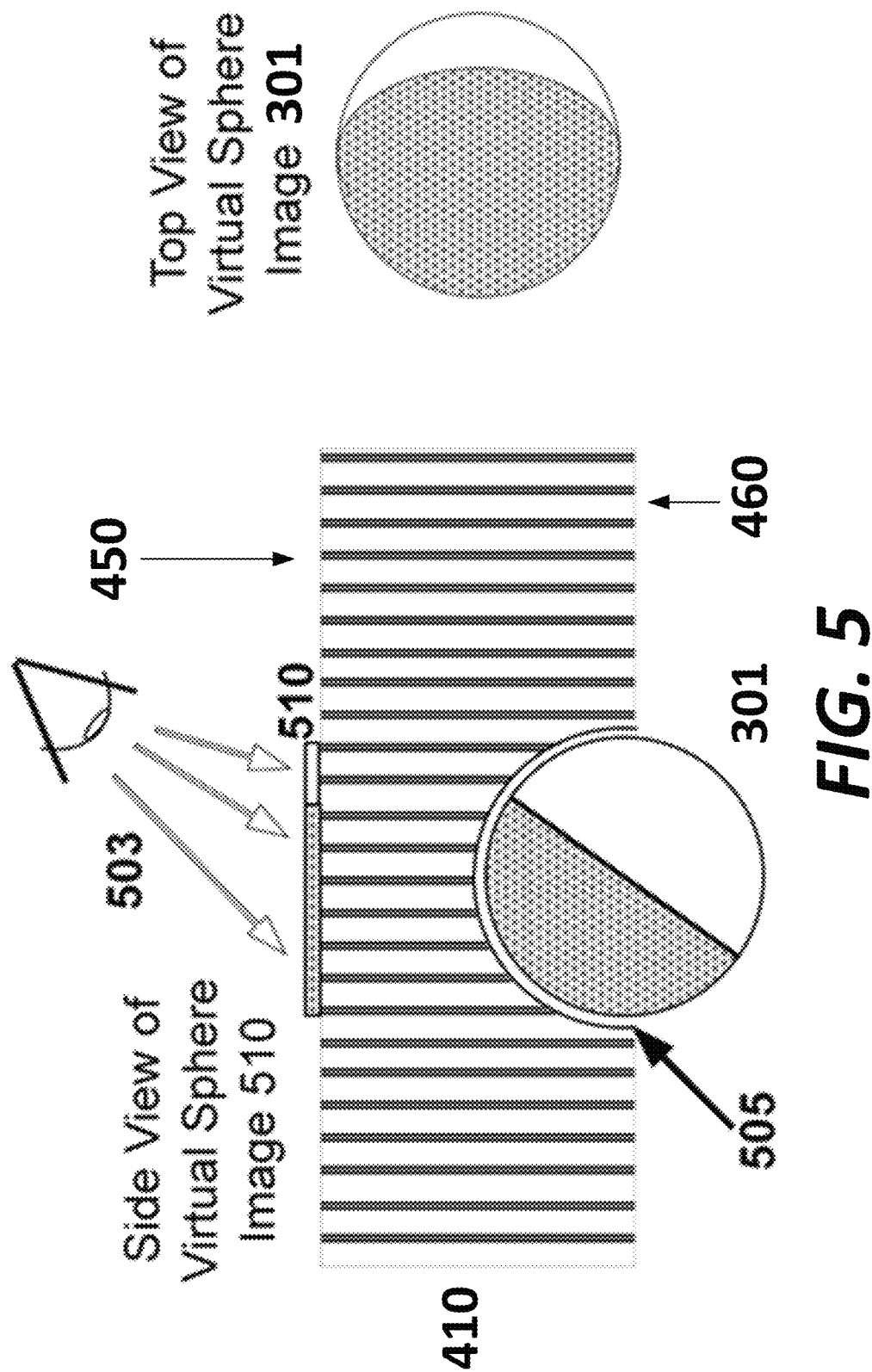
FIG. 5 schematically shows the FIFOP having a cavity in accordance with illustrative embodiments.

FIG. 5 schematically shows the FIFOP 410 having the cavity 505 in accordance with illustrative embodiments. As shown, a bisected lunar sphere 301 is configured to rotate (e.g., once per synodic month). The sphere 301 is mounted under the FIFOP 410 within the matching hemispherical cavity 505. The bundle of fiber optics 430 transmits a virtual image 510 of the lunar sphere 301 to the top surface 450, removing depth information and thus eliminating any angle-dependence to the apparent phase.

Illustrative embodiments advantageously provide a visually accurate representation of the moon's phase by placing a lunar sphere underneath a specially shaped FIFOP 410. Because the optical fibers 430 in the FIFOP 410 have a high numerical aperture (typically greater than 0.6), they can collect light from relatively wide angles—but to avoid distortion, the lunar sphere 301 is positioned very close to the fiber surface. To achieve this, the FIFOP 410 has a shape configured to correspond to the model. Thus, in various embodiments, the FIFOP 410 has a bottom surface 460 that at least in part forms a substantially hemispherical recess 505 or cavity 505 that partially surrounds the lunar sphere 301, keeping the sphere tightly aligned and in near contact with the fiber ends (e.g., the FIFOP 410 surface). This allows the FIFOP 410 to transmit a sharp, flattened image 510 of the lunar phase to its top surface 450 (e.g., flat surface) an image that accurately reflects the lighting and shape of the moon model, and remains consistent regardless of viewing angle.

The term "surface" of the FIFOP 410 refers to the macroscopically shaped boundary formed by the polished or machined ends of a bundle of fused optical fibers. Although the surface is composed of discrete fiber ends, and may include microscopic gaps or discontinuities between adjacent fibers, it is considered a continuous optical surface within the meaning of this disclosure because it presents a visually uniform appearance to a human observer under ordinary viewing conditions, such as those typical for timekeeping devices (particularly when viewed through a protective watch crystal). This concept of "surface" encompasses both flat regions used for image viewing and non-planar regions, such as cavities or recesses, which may be shaped to optically interface with a modeled object like a lunar sphere. Notably, the surface forming the cavity need not be smooth, and in some embodiments may include stepped or terraced features that improve optical performance by redirecting shallow-angle light. Nevertheless, such structures are still referred to as a "surface" for the sake of discussion. The surface is sufficiently coherent, co-terminus, and optically functional to enable the FIFOP 410 to transmit a high-fidelity virtual image from one side to the other without perceptible distortion from the source model.

As used herein, the term "bottom surface" of the device refers broadly to the side or region of the optical component opposite the viewing surface, and includes any portion of the structure that is configured to interface optically with the three-dimensional object being imaged. The bottom surface may include flat, curved, concave, stepped, recessed, or terraced portions, and is not limited to a continuous or uninterrupted plane. In some embodiments, the concavity or cavity may be integrally formed within the bottom surface; in others, it may be formed as part of or adjacent to a structural extension or base that supports the imaging function. Accordingly, a concave or shaped portion that is connected to, protrudes from, or otherwise forms the optical input side of the device shall be considered part of the "bottom surface" for purposes of this disclosure.

For clarity, the term "surface" may also include any concave, recessed, or shaped portion that is formed within, adjacent to, or supported by the structure formed from the fiber ends, whether as an integral recess or as part of an attached or underlying feature that functions to optically interface with the modeled object. Thus, features that protrude from, extend below, or are functionally coupled to the fiber ends on the input side may be regarded as part of the bottom surface for purposes of this disclosure.

It is noted that the lunar sphere of various embodiments is a relatively simple geometric form, and that a slightly diffuse or softened edge at the terminator (i.e., the line or zone where the two boundary between contrasting light and dark regions) may be considered an acceptable or even desirable artistic effect in some embodiments. Indeed, the actual cratered lunar surface produces such a diffused effect. As such, the hemispherical cavity in the FIFOP 410 does not need to precisely match the radius of the lunar sphere. In general, maintaining the cavity dimensions within approximately 10% of the lunar sphere's diameter is sufficient to preserve virtual image fidelity and produce a visually accurate and aesthetically pleasing lunar phase representation 510.

Various embodiments maintain a separation of less than 10%. A separation of 10% results in a blurry terminator, not too unlike the soft-edged terminator visible on the actual moon. If a sharper virtual image is desired, given the high fiber NA and practical FIFOP 410 dimensions, the surface of the rotating bi-sphere should be within a mm or less of the hemispherical pocket in the FIFOP 410.

The phrase "within approximately 10% of the lunar sphere's diameter" refers to the allowable tolerance in the spatial relationship between the surface of the lunar sphere 301 and the surface of the hemispherical cavity 505 of the FIFOP 410. The radial separation—or the gap between the lunar sphere 301 and the cavity wall-should be no more than 10% of the total diameter of the lunar sphere 301. For example, if the sphere 301 has a diameter of 10 mm, then the cavity 505 should ideally position the surface of the model sphere 301 no more than 1 mm away from the FIFOP surface (e.g., cavity 505 surface) at any point. This proximity ensures that each overlaying optical fiber 430 transmits light from the correct location on the sphere 301 surface, minimizing image distortion or blending across adjacent regions.

In addition to this radial proximity, other dimensional and geometric configurations of the FIFOP 410 also influence image fidelity. The cavity 505 should be substantially hemispherical in shape, or at least conformal to the outer geometry of the lunar sphere 301, to maintain even and close spacing across the visible hemisphere, and to allow for rotation without binding or interference. For best results—especially when a sharper terminator line is desired—the surface of the sphere should be placed within 1 mm or less of the fiber bundle interface across its entire visible region. The numerical aperture (NA) of the fibers plays a crucial role here: a higher NA (>0.6) allows for wide-angle viewing but also increases the risk of cross-talk and blurring if the object is too far from the fiber surface. Therefore, careful alignment and consistent spacing are critical design parameters to ensure that the virtual image projected on the FIFOP 410 surface accurately and sharply reflects the simulated lunar phase.

The hemispherical cavity with a flat viewing surface acts like a plano-concave lens. This can lead to an undesirable vignetting of the image of the bi-sphere due to the effect of total internal reflection.

Figure 6:
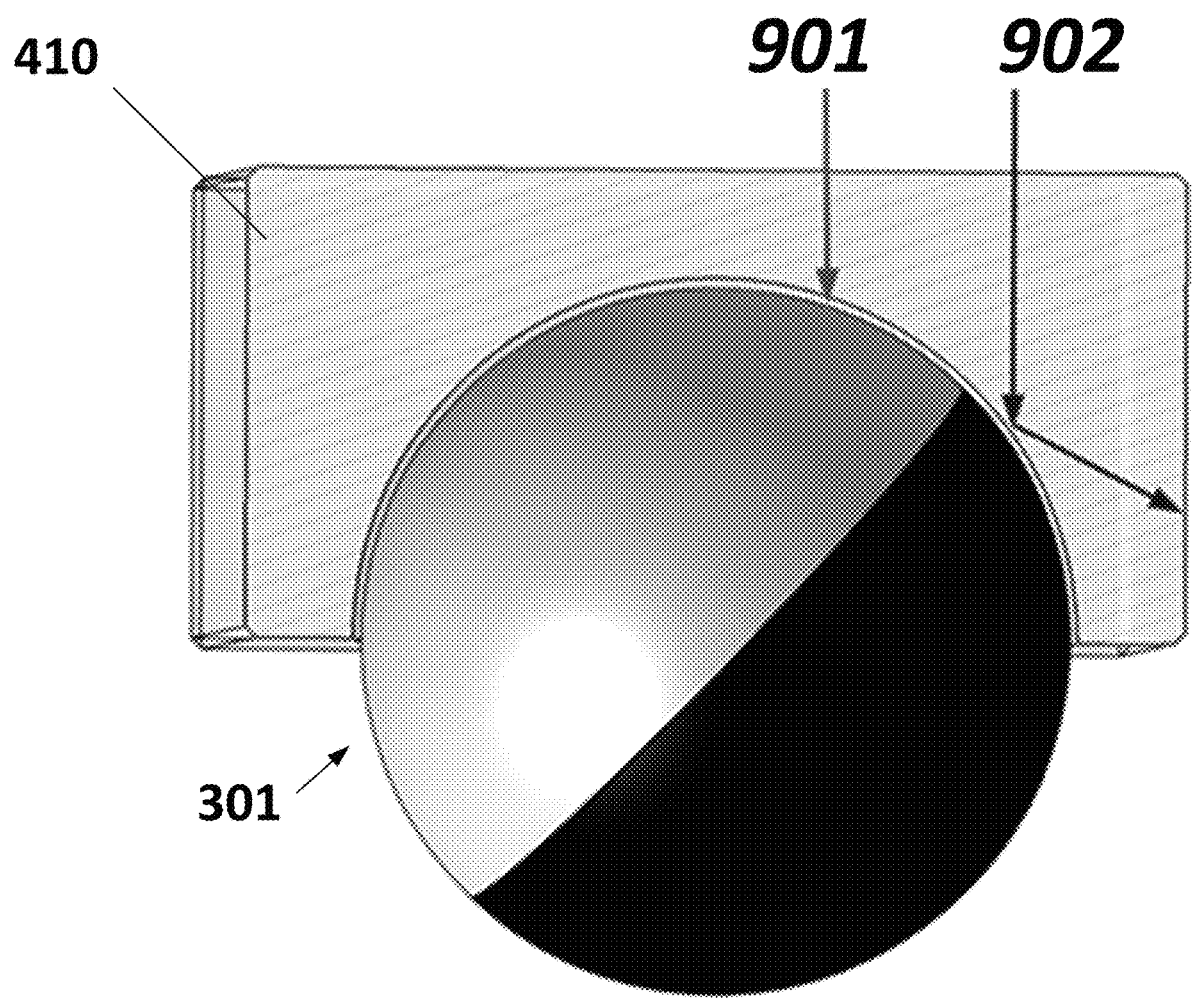
FIG. 6 schematically shows light rays interacting with the FIFOP in accordance with illustrative embodiments.

FIG. 6 illustrates light rays interacting with the FIFOP 410 in accordance with illustrative embodiments. Light ray 901 enters the FIFOP 410 nearly perpendicularly and transmits cleanly to the lunar sphere 301. Light ray 902, entering at a shallow angle, is deflected due to partial or total internal reflection. This demonstrates how angular light paths can cause vignetting and image distortion in a smooth-walled cavity.

Ray 901 approaches the bi-sphere nearly perpendicularly to the air/FIFOP 410 interface, so passes through unimpeded. However, incident ray 902 approaches the air gap at a shallow angle above the criteria for total internal reflection, and is diverted away from the bi-sphere, vignetting and distorting the image.

This effect can be avoided in a number of ways, for example, by filling the air gap between the FIFOP 410 and bi-sphere with index matching fluid. Sealing the resulting cavity from leaks while allowing for mechanical access of the rotating bi-sphere axle can be accomplished though techniques known in the art, for example, with a magnetic rotary feedthrough. An index-matching gel can be contained by a simple sleeve bearing.

Alternatively, incising a series of stepped flat terraces into the surface of the hemispherical cavity eliminates any shallow angle optical paths. These optically-clear flats can be produced, for example, by diamond machining.

Figure 7:
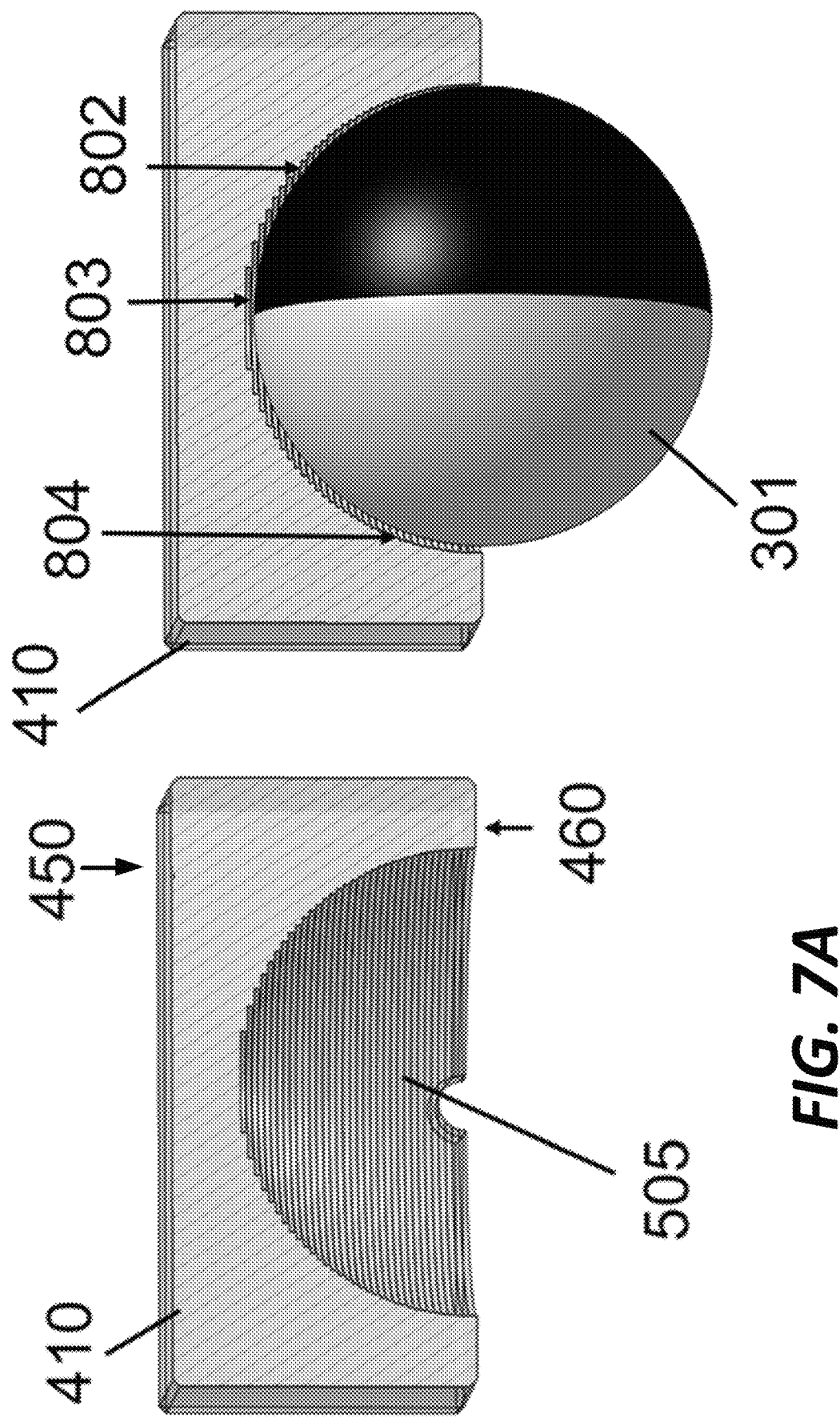
FIGS. 7A-7B schematically shows a perspective cross-section of the FIFOP incorporating a stepped internal cavity for housing a rotating lunar sphere in accordance with illustrative embodiments.

FIG. 7A schematically shows a perspective cross-section of the FIFOP 410 410 incorporating a stepped internal cavity for housing a rotating lunar sphere. As shown, the lunar sphere is removed, revealing a cavity composed of concentric flat terraces or step-like features. These terraces replace a smooth, curved surface to interrupt shallow-angle light paths, thereby minimizing optical distortion such as vignetting caused by total internal reflection.

FIG. 7B schematically shows the FIFOP 410 of FIG. 7A with the lunar sphere 301 placed into the stepped cavity. Light rays 802, 803, and 804 are shown exiting the stepped fiber surface and propagating directly toward the surface of the lunar sphere. Because each ray exits from a flat, perpendicular segment of the stepped cavity 505, it avoids bending or being reflected at shallow angles, which can occur in smooth curved cavities. This configuration ensures that light from all relevant angles reaches the lunar sphere cleanly, improving the clarity, uniformity, and angular stability of the resulting virtual lunar phase image on the opposite flat viewing surface of the FIFOP 410. Alternatively, some embodiments may have a smooth surface for the cavity 505 and use index fluids.

Figure 3:
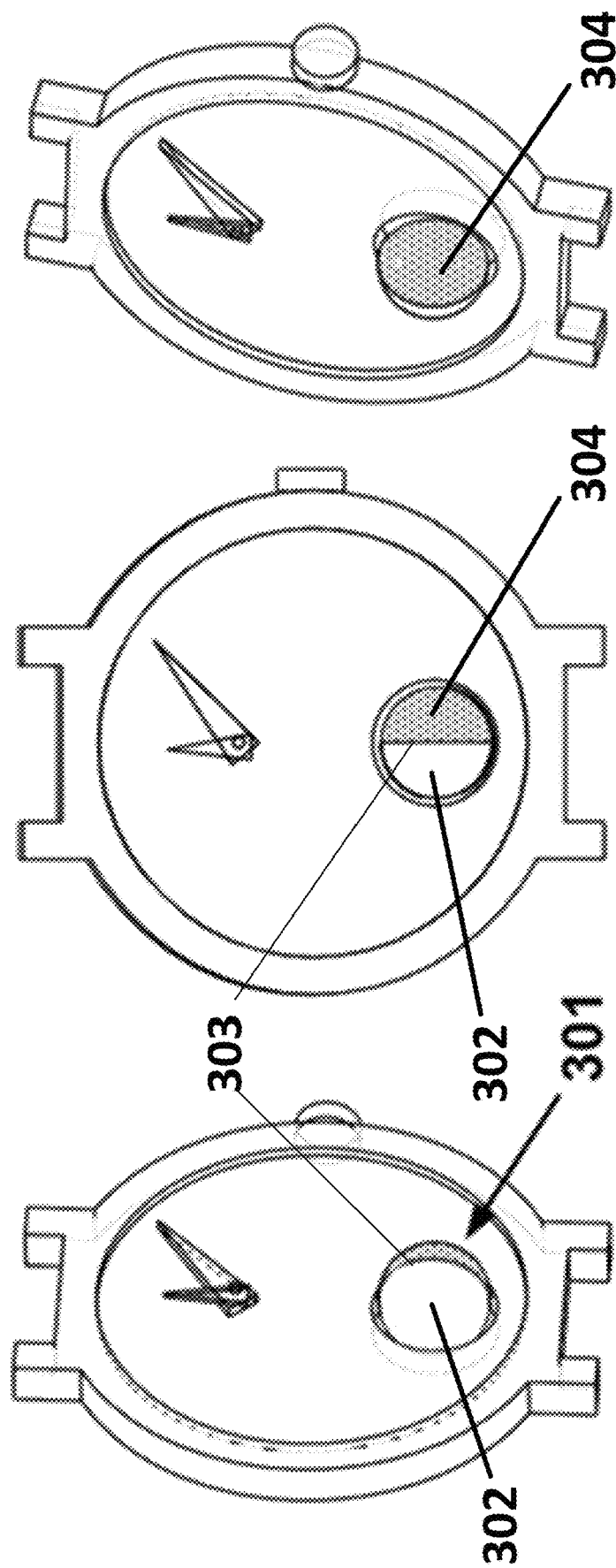
FIGS. 3A-3C schematically show a lunar sphere display viewed at three angles to the watch face in accordance with illustrative embodiments.

FIG. 8 schematically shows a FIFOP 410 mounted over a bisected lunar sphere 301 (e.g., of FIG. 3, watch crystal not shown for clarity). FIG. 8 shows an oblique view 624, a top perspective view 604, and a front view 614. The virtual image 510 of the sphere 301 is now a high fidelity rendering of the actual lunar phase, and independent of view-angle. Illustrative embodiments advantageously improve upon the lunar sphere display of the watch 601 by aligning a FIFOP 410 with a hemispherical cavity 505 over the sphere 301. This creates a virtual image 510 of the moon as seen perpendicularly to the FIFOP 410 front surface. By translating the image to this surface, the FIFOP 410 allows the sphere to be placed deeper in case 601, so the watch is thinner.

Figure 9:
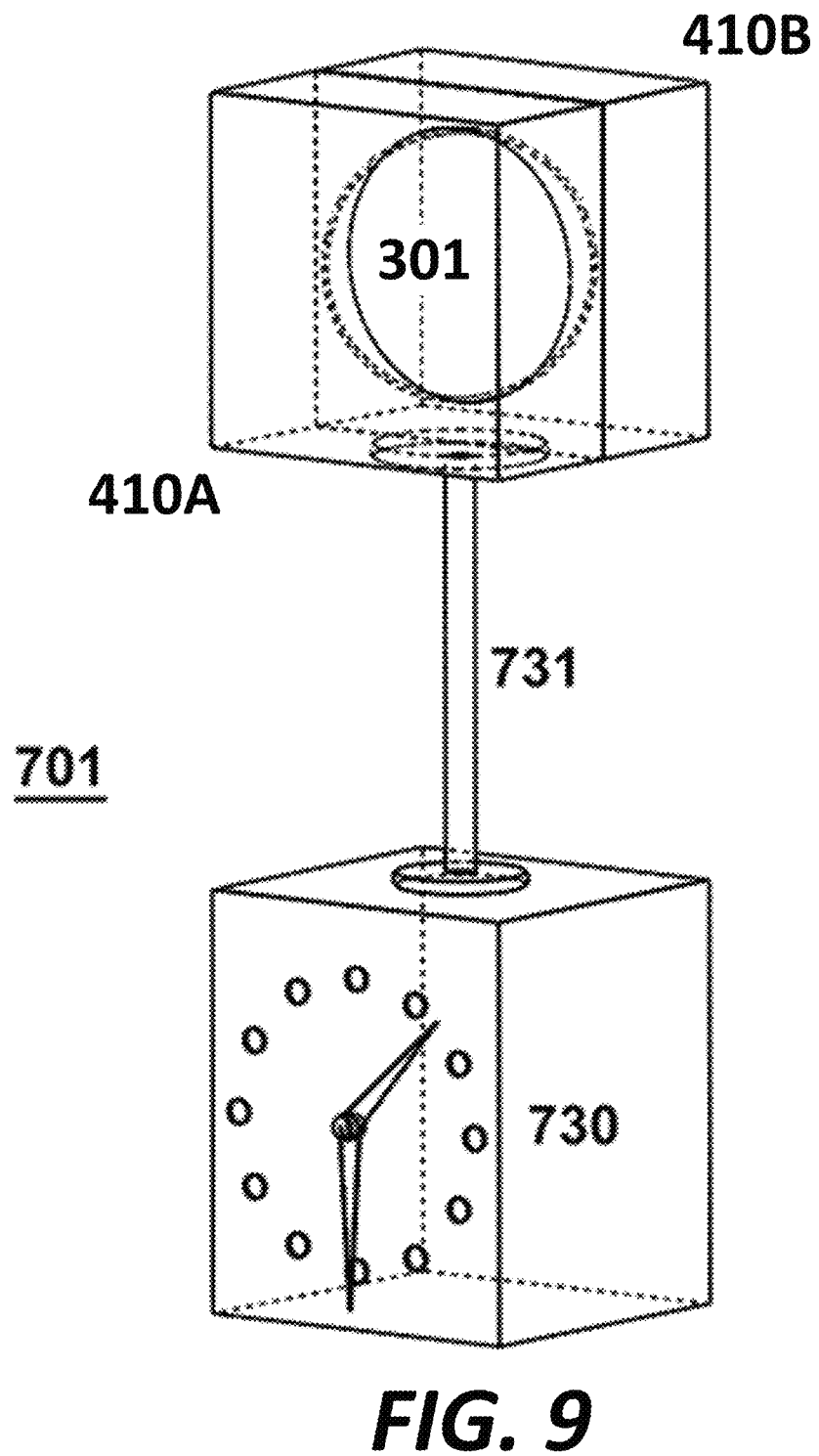
FIG. 9 schematically shows a desk-clock version in accordance with illustrative embodiments.

FIG. 9 schematically shows a desk-clock version in accordance with illustrative embodiments. A desktop clock 701 may also be provided in accordance with illustrative embodiments. Here, a lunar sphere 301 is encased within FIFOPs 410A and 410B. A clockwork mechanism 730 drives a shaft (not shown) in column 731 to rotate the lunar sphere 301.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein.

The FIFOP 410 surfaces may be anti-reflection coated to reduce glare. Decorative features, such a colored background or stars on the planar FIFOP 410 surface may enhance the impression of a moon suspended in the sky. FIFOP 410B could be replaced by glass, so the user might compare a two and three-dimensional view of the lunar sphere. The FIFOP 410 could include a taper to expand the lunar phase virtual image dimensions (at the expense of contrast and thickness). A FIFOP 410 rod can bend the image by 90 degrees. A FIFOP 410 with a smaller numerical aperture on the lunar sphere side reduces the need for the hemispherical cavity to closely match the sphere's diameter, which may then be enlarged or truncated while still replicating the lunar phase, (albeit slightly blurred but aesthetically acceptable). Or, with advances in diffractive and meta lenses, these thin lenses may substitute for the FIFOP 410 plate if it they demonstrate similar optical capabilities.

Figure 10:
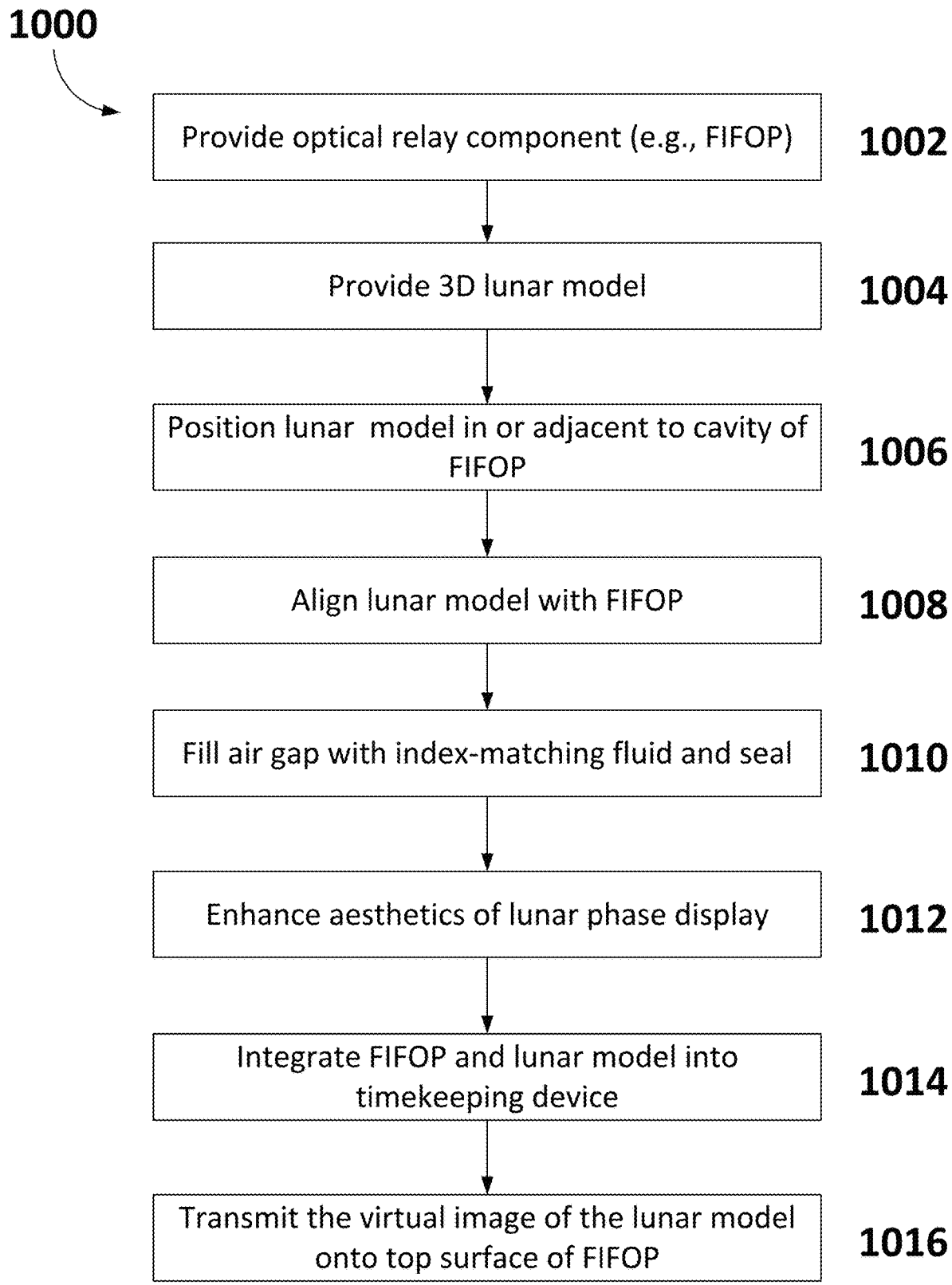
FIG. 10 shows a process of displaying a high-fidelity lunar phase in a timekeeping device in accordance with illustrative embodiments.

FIG. 10 shows a process 1000 of displaying a high-fidelity lunar phase in a timekeeping device in accordance with illustrative embodiments. It should be noted that this method is substantially simplified from a longer process that may normally be used. Accordingly, the method shown in FIG. 10 may have many other steps that those skilled in the art likely would use. In addition, some of the steps may be performed in a different order than that shown, or at the same time. Furthermore, some of these steps may be optional in some embodiments. Accordingly, the process 1000 is merely exemplary of one process in accordance with illustrative embodiments. Those skilled in the art therefore can modify the process as appropriate.

The process begins at step 1002 by providing an optical relay component. The optical relay component may include, among other things, the FIFOP 410. The FIFOP 410 is shown and described throughout the application. For example, the FIFOP 410 may be the FIFOP 410 shown in any of FIGS. 4-9. The FIFOP 410 may be formed from by fusing and aligning thousands of optical fibers into a solid bundle. The FIFOP 410 may be fabricated from a bundle of optical fibers, each comprising a high-index core and lower-index cladding, typically formed from glass materials such as silica or borosilicate. For ease of discussion, reference to FIG. 10 discusses the FIFOP, but it should be understood that another alternative optical relay component may be used in a similar manner.

In alternative embodiments, polymer-based optical fibers may be used where flexibility, lower cost, or ease of machining is desired, although with trade-offs in optical resolution. The fibers are fused or bonded to form a rigid imaging plate, with at least one polished output surface and an opposite surface shaped to define a cavity, allowing light from a three-dimensional object to be relayed as a two-dimensional virtual image.

One or more faces of the FIFOP 410 may be polished flat to serve as the viewing surface. A cavity may also be formed in the FIFOP 410. In particular, the cavity may be formed into the opposite side of the FIFOP 410 (from the substantially flat face), using either a smooth hemispherical profile (e.g., with index fluid) or a series of stepped flat terraces.

The cavity within the fused imaging fiber optic plate may be manufactured using precision grinding, diamond turning, or CNC micromachining techniques, depending on the desired geometry (e.g., for smooth cavities). Illustrative embodiments having stepped terraces, the cavity may be incised using ultra-precision diamond tooling to form a series of flat, concentric surfaces that minimize optical distortion due to shallow-angle light paths. Alternatively, laser ablation or micro-milling may be employed to create custom cavity geometries. Or, a bundle of fibers can be pressed against a hemisphere and in so doing form a cavity, the fiber bundle is then fused or glued together. The resulting cavity comprises the cut or polished ends of discrete optical fibers, forming a structured surface that interfaces optically with the underlying lunar model. Those skilled in the art can use a number of methods to form the flat surface and/or the cavity of the FIFOP 410.

The process proceeds to step 1004, which provides the lunar model. In illustrative embodiments, the lunar model is formed as a three-dimensional sphere or moon-shaped body having contrasting illuminated and darkened regions, typically by applying a light-absorbing or light-reflective material to opposing portions of the surface, or by forming the model from materials of differing optical properties. The lunar model is mounted on a rotatable shaft or axle, which is driven by a gear train or motor synchronized to the lunar synodic period, such that the model rotates over time to simulate the progression of the moon's phases. The gear mechanism may be synchronized to the lunar synodic period (~29.5 days) to simulate the natural lunar cycle.

At step 1006, the rotating lunar model is then positioned within the cavity formed on one surface of the FIFOP 410. This cavity may be shaped to conform closely to the outer contour of the model, and is dimensioned to maintain the model in close optical proximity to the fiber input ends, enabling the accurate transmission of a high-fidelity virtual image to the opposite, flat surface of the FIFOP 410. The rotating lunar sphere is positioned into the cavity so that its surface remains in close proximity to the fiber ends—ideally within 10% of the sphere's diameter or within 1 mm for sharper images.

At step 1008, the lunar sphere is aligned with the FIFOP 410. Ensure the axis of rotation and the visible hemisphere of the sphere are properly oriented relative to the viewer-facing surface. To ensure accurate and stable representation of the lunar phase, illustrative embodiments optically align the lunar sphere with FIFOP 410. Specifically, the axis of rotation of the lunar sphere should be oriented to ensure that the dividing line between the illuminated and darkened regions (i.e., the simulated lunar terminator) rotates in a manner consistent with the actual moon as observed from Earth. The sphere should be centered within the cavity of the FIFOP 410 such that the light and dark hemispheres are symmetrically projected to the flat viewing surface of the plate. Proper alignment minimizes angular distortion and ensures that the virtual image produced on the FIFOP 410 surface maintains geometric and photometric fidelity, accurately reflecting the intended phase of the moon at any given time. In some embodiments, physical registration features or optical calibration procedures may be used during assembly to maintain correct alignment throughout operation.

At step 1010, illustrative embodiments may mitigate optical distortion by (a) filling the gap with index-matching fluid and sealing it, and/or (b) using stepped terraces in the cavity to eliminate shallow-angle light paths. For example, the gap between the lunar sphere and the FIFOP 410 may be filled with an index-matching fluid or gel, reducing refractive mismatches and allowing light to pass cleanly into the fibers. Alternatively, the cavity surface within the FIFOP 410 may be fabricated with stepped flat terraces, which prevent shallow-angle light from reflecting away by ensuring that incident rays encounter fiber ends at or near normal incidence. These approaches enhance the clarity and edge fidelity of the virtual image displayed on the viewing surface.

The index-matching fluid or gel may have a refractive index closely matched to that of the fiber material (e.g., between 1.43 and 1.47). Suitable materials may include optical-grade silicone oils, Cargille index-matching fluids, or high-viscosity optical gels such as those used in fiber optic coupling. These substances reduce internal reflections, eliminate refractive boundaries, and improve image fidelity at the fiber-object interface. In gel-filled embodiments, a sleeve bearing may be used to retain the gel while allowing rotation of the lunar sphere. In fluid-filled systems, the cavity may be sealed using magnetic rotary feedthroughs or flexible diaphragms to maintain optical continuity without leakage.

At step 1012, enhance aesthetics Apply anti-reflection coatings, star-pattern backgrounds, or photorealistic texturing to further enhance the realism and visual appeal of the display. Aesthetic enhancements may be incorporated to improve the overall visual impression of the lunar phase display. For instance, the flat viewing surface of the FIFOP 410 may be anti-reflection coated to reduce glare and improve contrast. Additionally, decorative elements such as a star field, night sky background, or colored backdrop may be printed or embedded on the viewing surface of the FIFOP 410 to create the illusion of a moon suspended in space, further enhancing the user's experience without interfering with the optical function of the display.

At step 1014 the FIFOP 410 is integrated into the timekeeping device. To that end, illustrative embodiments mount the FIFOP 410 assembly within a watch or clock case, aligning the virtual image with the visible window or display region. The FIFOP 410 assembly, including the rotating lunar sphere and associated drive mechanism, may be mechanically integrated into a timekeeping device, such as a wristwatch or desk clock. The FIFOP 410 is mounted such that its flat viewing surface is visible through a transparent watch crystal or display window, allowing the virtual image of the moon phase to be prominently featured on the watch face or clock dial. The overall assembly is designed to be compact, durable, and compatible with existing horological form factors, enabling seamless integration with traditional or modern timekeeping designs.

At step 1016 the process transmits the virtual image. As the lunar sphere rotates within the cavity of the FIFOP 410, room light enters the fiber plate from the viewing surface. This illumination light reflects off its contrasting regions and enters the input ends of the optical fibers that make up the FIFOP 410. Each fiber transmits this light to its corresponding position on the flat output surface, where it emerges to form a two-dimensional virtual image of the three-dimensional lunar model. The resulting image appears stable, sharp, and angle-independent, faithfully depicting the current lunar phase in a manner that closely resembles the actual moon as viewed from Earth.

The process 1000 then comes to an end.

The advantages of illustrative embodiments should be apparent to one skilled in the art. Various embodiments provide an elliptical terminator shape with high fidelity. To that end, a sphere bisected into contrasting hemispheres rotates in synchrony with the lunar synodic month. The apparent lunar phase of this sphere depends on the viewing angle of the user. To eliminate this angular dependency, the FIFOP 410 containing a substantially hemispherical recess mounts over the bisected sphere, converting the view of the three-dimensional rotating moon sphere into a two-dimension virtual image that matches the actual lunar terminator shape with high fidelity, independent of viewing angle.

While illustrative embodiments described herein focus on the display of lunar phases using a three-dimensional lunar model, it should be understood that the underlying system—including the FIFOP with a shaped cavity configured to relay a virtual image of a 3D object—is broadly applicable to a wide variety of contexts beyond horology. Illustrative embodiments may be adapted to any application where a compact, angle-independent, two-dimensional image of a three-dimensional object (e.g., rotatable object) is desirable.

For example, the system may be used in scientific and educational tools to display rotating astronomical models, molecular structures, or anatomical forms. In industrial instrumentation, the FIFOP cavity arrangement may be applied to convey the orientation of mechanical components, such as valves or shafts, via a stable 2D output surface, even when the object is enclosed or inaccessible. In secure display systems, the illustrative embodiments may present tamper-resistant readouts or visual verification elements by hiding the physical object and exposing only its virtual image.

Although the embodiments described herein refer primarily to spherical or hemispherical models and cavities, this is not intended to limit various embodiments. The shaped cavity of the FIFOP may conform to any three-dimensional geometry, including cylindrical, ellipsoidal, or irregular forms, and the corresponding 3D model may be designed accordingly. When the object is positioned in optical proximity to the fiber ends, and the interface is shaped to allow light to enter the fibers from the object surface at acceptable angles, the virtual image may be transmitted with high fidelity. This enables a wide range of display applications using non-spherical objects and cavity profiles, such as rods, spindles, geometric primitives, or rotating mechanisms.

Figure 11:
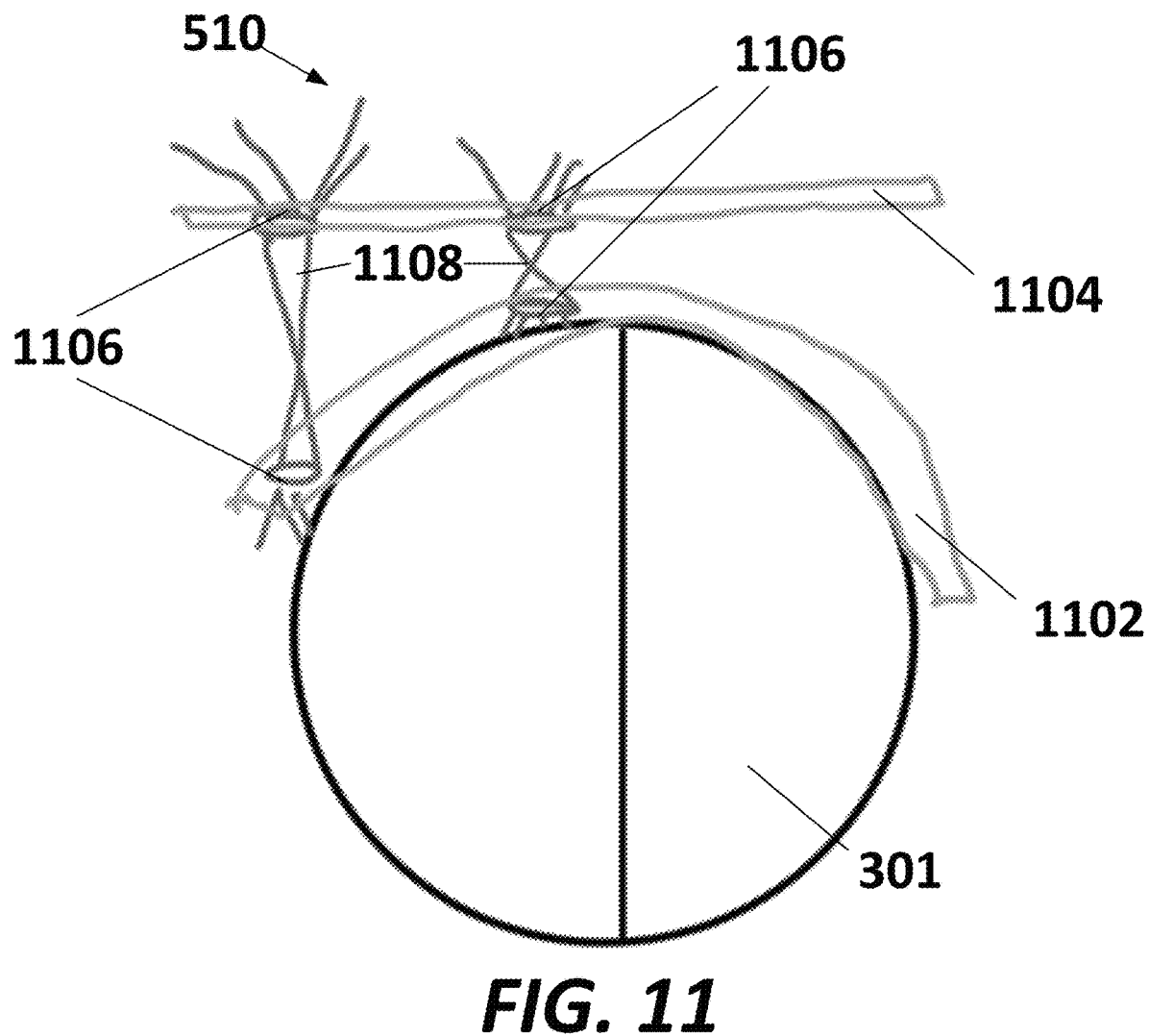
FIG. 11 schematically shows an alternative optical relay system for transmitting a virtual image from a three-dimensional model to a flat viewing surface in accordance with illustrative embodiments.

In some alternative embodiments, the function of the FIFOP may be replaced by an optical relay system (generally within the class of optical relay components) composed of two aligned microlens arrays. FIG. 11 schematically shows an alternative optical relay system for transmitting a virtual image from a three-dimensional model to a flat viewing surface without the use of a fused imaging fiber optic plate (FIFOP). In this embodiment, the optical system includes a curved microlens array 1102 positioned adjacent to the surface of the 3D model 301 and a flat microlens array 1104 aligned above it.

Light rays 1108 emanating from the 3D model 301 are collected and redirected by the curved lens array 1102, relayed through air or optical material, and then passed through corresponding microlenses 1106 in the flat relay plate 1108, producing a flattened, angle-independent virtual image 510 at the upper surface. Proper functioning requires precise one-to-one optical alignment between the curved and flat arrays. Although this arrangement may produce a similar effect to that of a FIFOP, such a configuration is currently difficult and costly to implement at high resolution, especially in small-scale devices like wristwatches. However, it may be suitable for larger-scale implementations, such as tower clocks or architectural displays, where mechanical tolerances are more forgiving.

As used in this specification and the claims, the singular forms "a," "an," and "the" refer to plural referents unless the context clearly dictates otherwise. For example, reference to "the FIFOP" in the singular includes a plurality of FIFOPs, and reference to "the model" in the singular includes one or more models and equivalents known to those skilled in the art. Thus, in various embodiments, any reference to the singular includes a plurality, and any reference to more than one component can include the singular.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein.

It is, therefore, to be understood that the foregoing embodiments are presented by way of example only and that, within the scope of the appended claims and equivalents thereto, inventive embodiments may be practiced otherwise than as specifically described and claimed. Illustrative embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Disclosed embodiments, or portions thereof, may be combined in ways not listed above and/or not explicitly claimed. Thus, one or more features from variously disclosed examples and embodiments may be combined in various ways. For example, it is to be understood that the present disclosure contemplates that, to the extent possible, one or more features of any embodiment can be combined with one or more features of any other embodiment.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the above discussion discloses various exemplary embodiments of the invention, it should be apparent that those skilled in the art can make various modifications that will achieve some of the advantages of the invention without departing from the true scope of the invention.

What is claimed is:

1. A device for producing a view-independent virtual image of a three-dimensional object, comprising:
   a three-dimensional model comprising at least two visually distinct regions;
   a fused imaging fiber optic plate (FIFOP) comprising a bundle of optically aligned fibers, the FIFOP having:
   (i) a viewing surface formed by the polished output ends of the fibers; and
   (ii) a shaped cavity formed on the opposite side of the FIFOP, the cavity defined by input ends of the fibers and configured to receive the three-dimensional model in close proximity;
   wherein the FIFOP is configured to transmit a virtual image of the three-dimensional model to the viewing surface such that the image appears angle-independent to an observer.

2. The device of claim 1, wherein the three-dimensional model is rotatable within the cavity, and the visually distinct regions represent the illuminated and shadowed portions of a lunar phase.

3. The device of claim 1, wherein the shaped cavity comprises a series of stepped flat terraces configured to minimize optical distortion caused by light rays bending at the cavity surface.

4. The device of claim 1, wherein the space between the model and the FIFOP is filled with an index-matching fluid or gel to reduce internal reflection.

5. The device of claim 1, wherein the three-dimensional model is mounted on an axle and mechanically synchronized to a time-based cycle.

6. The device of claim 1, wherein the cavity is substantially hemi-spherical and the model is substantially spherical, and the cavity conforms to the geometry of the model to maintain optical proximity.

7. The device of claim 1, wherein the surface of the three-dimensional model is positioned within approximately 10% of a diameter of the model from the fiber input ends of the FIFOP.

8. The device of claim 1, wherein the surface of the three-dimensional model is positioned within 1 millimeter of the fiber input ends of the FIFOP to preserve high virtual image fidelity.

9. A method of displaying a high-fidelity lunar phase in a timekeeping device, comprising:
   providing a three-dimensional moon model, the model comprising visually contrasting regions configured to represent the illuminated and darkened portions of the lunar of the moon;
   positioning an optical relay component that converts a 3D image into a 2D virtual image over at least a portion of the moon model, the optical relay component having a viewing surface and a cavity, wherein the three-dimensional model is disposed within or proximate to the cavity;
   altering the orientation of the three-dimensional moon model to simulate the progression of lunar phases over time;
   providing a virtual image of the moon model on the viewing surface of the optical relay component; and
   integrating the virtual image surface of the optical relay component into a visible portion of a watch or clock housing.

10. The method of claim 9, wherein integrating the virtual image surface enables a user to observe an accurate, angle-independent representation of the moon's phase.

11. The method of claim 9, wherein the proximity between the surface of the moon model and the cavity wall is maintained within approximately 10% of the diameter of the model to preserve image fidelity.

12. The method of claim 9, further comprising mitigating vignetting caused by total internal reflection by (i) filling the space between the moon model and the optical relay component with an index-matching fluid and sealing the cavity using a leak-resistant mechanism, and/or (ii) forming a plurality of stepped, flat terraces in the cavity surface to eliminate shallow-angle optical path.

13. The method of claim 9, wherein rotating the spherical model about its axis is in synchrony with the lunar synodic period, such that the bisected hemispheres simulate the changing illumination of the moon as seen from Earth.

14. The method of claim 9, wherein the optical relay component is a FIFOP comprising optical fibers with a numerical aperture (NA) greater than 0.6, thereby maintaining image fidelity over a wide range of viewing angles.

15. The method of claim 9, wherein the hemispherical cavity of the FIFOP has a radius within 10% of the diameter of the lunar sphere, thereby preserving proximity for high-fidelity virtual imaging.

16. The method of claim 9, further comprising introducing an index-matching fluid between the lunar sphere and the FIFOP to reduce internal reflections and enhance optical clarity.

17. The method of claim 9, wherein the spherical model is rotated by a gear train synchronized to the lunar synodic month.

18. The method of claim 9, further comprising the step of mounting the FIFOP and lunar sphere assembly within a timekeeping device selected from a wristwatch or a clock.

19. The method of claim 9, wherein the opposite surface of the FIFOP presents the virtual image on a flat display window of the timekeeping device, such that the user perceives a consistent lunar phase image from any angle.

20. A high-fidelity lunar phase display device comprising:
   one surface of FIFOP placed atop a rotating lunar sphere, the lunar phase viewed on the opposing surface of the FIFOP, such that the FIFOP contains a cavity larger than the rotating lunar sphere, and the sphere rotates within the cavity.

* * * * *